(12) United States Patent
Johnson et al.

(10) Patent No.: US 7,528,089 B2
(45) Date of Patent: May 5, 2009

(54) HIGH SOLIDS MATERIALS PROCESSING

(75) Inventors: Ivy D. Johnson, Lawrenceville, NJ (US);
Kirk D. Schmitt, Pennington, NJ (US);
Steven T. Ragomo, Perkasie, PA (US);
Stephen G. Casmer, Bethlehem, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 682 days.

(21) Appl. No.: 10/966,445

(22) Filed: Oct. 15, 2004

(65) Prior Publication Data

US 2005/0142060 A1 Jun. 30, 2005

Related U.S. Application Data

(60) Provisional application No. 60/533,285, filed on Dec. 30, 2003.

(51) Int. Cl.
| | |
|---|---|
| *B01J 20/30* | (2006.01) |
| *B01J 20/16* | (2006.01) |
| *B01J 20/18* | (2006.01) |
| *B29C 47/78* | (2006.01) |
| *B29C 47/80* | (2006.01) |
| *C01B 33/26* | (2006.01) |
| *C01B 39/44* | (2006.01) |
| *C01B 39/28* | (2006.01) |
| *C01B 39/02* | (2006.01) |

(52) U.S. Cl. .............. 502/60; 502/64; 502/67; 502/68; 502/71; 502/80; 502/407; 502/514; 423/700; 423/327.1; 423/328.1; 423/328.2; 106/122; 264/41; 264/42; 264/211.21; 264/211.24

(58) Field of Classification Search ............. 423/700, 423/327.1, 328.1, 328.2; 502/60, 64, 67, 502/68, 71, 80, 407, 514; 106/122; 264/41, 264/42, 211.21, 211.24
See application file for complete search history.

(56) References Cited

U.S. PATENT DOCUMENTS

| | | | | |
|---|---|---|---|---|
| 5,240,892 | A | 8/1993 | Klocke | 502/77 |
| 5,558,851 | A | 9/1996 | Miller | 423/702 |
| 6,387,349 | B1 | 5/2002 | Kulkarni et al. | 423/707 |
| 6,663,845 | B1 * | 12/2003 | Hasuyama et al. | 423/700 |
| 6,723,300 | B2 * | 4/2004 | Schmitt et al. | 423/705 |
| 6,903,040 | B2 * | 6/2005 | Stamires et al. | 502/60 |
| 2003/0003035 | A1 | 1/2003 | Stamires et al. | 422/225 |

FOREIGN PATENT DOCUMENTS

| | | | |
|---|---|---|---|
| EP | 0027912 | * | 5/1981 |
| EP | 1203615 A1 | | 5/2002 |
| EP | 1215172 A1 | | 6/2002 |

OTHER PUBLICATIONS

Perry et al, Perry's Chemical Engineer's Handbook (7th Edition), (1997) McGraw-Hill, pp. 18-25—18-30.*

* cited by examiner

*Primary Examiner*—David M Brunsman
(74) *Attorney, Agent, or Firm*—Liza Montalvo

(57) ABSTRACT

The present invention includes a microporous or mesoporous composition of matter in which the composition is formed continuously or semi-continuously in a heated reactor zone, including a rotary calciner or a rotary screw as a means for conveying the synthesis mixture, at a temperature between 200° C. and 500° C. with a residence time less than 24 hours. The reagents are solid and liquid reagents in which the solid reagents have a weight percent between 45% and 98% of the total reagents.

The invention also includes a continuous or semi-continuous process for the hydrothermal manufacture of the microporous or mesoporous composition.

12 Claims, 8 Drawing Sheets

HIGH SOLIDS MATERIALS PROCESSING

This application claims the benefit of U.S. Application No. 60/533,285 filed Dec. 30, 2003.

BACKGROUND OF THE INVENTION

The present invention relates to a composition of matter and a process to make it. In particular, the composition is a microporous or mesoporous material fabricated by a method that uses high solids materials processing.

The prior art includes two standard methods for materials processing for either crystallization or precipitation. The first is the standard autoclave crystallization process using commercially available equipment in a batch operation. This is the preferred approach to crystallizing microporous and mesoporous materials. The reaction mixture is stirred to assure uniform composition of the product. The finished product is typically washed, sent through a filtration system, and then dried for further processing. A second approach is a continuous precipitation process, producing a product that again requires filtration prior to further handling.

The present invention addresses materials synthesis and processing. There is also a need and desire for efficient exploration of high solids synthesis regimes. The typical approach in hydrothermal synthesis is to use autoclaves in a batch operation. Autoclaves are pressure vessels capable of withstanding the autogeneous pressures generated at crystallization temperatures in the 100-250° C. range. Autoclaves are cumbersome and manpower intensive. The present invention uses a continuous feed system that is more semi-continuous to continuous operation, dependent upon the configuration of the equipment, the feed, and reaction conditions required for the crystallization.

The present invention allows the evaluation and manufacture in high solids regimes. Typical batch crystallizations are run at relatively dilute suspensions, up to 15% solids. Current commercial autoclave technology cannot process reaction mixtures substantially in excess of about 15% solids because they are too thick to stir effectively. Inadequate stirring in a large, batch reactor leads to improper heat transfer and inadequate temperature control. Laboratory experiments are typically done on small scale where a uniform solid can be crystallized in a static operation. The process of this invention allows continuous throughput of the reactants. With suitable internal design of the rotor, the continuous process can mimic either static or stirred conditions as the reactants are transferred through the barrel. Adjusting the feed rate controls residence time. Also, adjusting the auger speed for an auger in a barrel configuration or adjusting the barrel rotation speed in a rotary calciner configuration impacts the residence time.

The use of continuous reactor processes is well known, particularly in the polymer area. For example, many processes for polymers that may be carried out continuously in extruders (see e.g., Reactive Extrusion, Principles and Practice, Xanthos, M., ed., Hanser Publishers, 1992). The advantage of such processes for continuously varying the product by varying the reagents is also known. For example, polymer properties may be controlled by adjusting the rate of periodic batches of manganese dioxide (see e.g., Suwanda, D.; Lew, R.; Balke, S. T. J. Appl. Polym. Sci. 1988, 35, 1019. "Reactive Extrusion of Polypropylene I: Controlled Degradation"). It is also known that the product may be controlled by continuously varying the temperature and reaction time by controlling the total feed rate to the extruder (see e.g., Xanthos, M. in Reactive Extrusion, Principles and Practice, Xanthos, M., ed., Hanser Publishers, 1992, page 44). It is also known that reagents may be added not only in the initial feed hopper but at points along the reaction path by injecting reagents into the extruder or by using tandem extruders (see e.g., Todd, D. B. in Reactive Extrusion, Principles and Practice, Xanthos, M., ed., Hanser Publishers, 1992, page 203 ff). This process is called "staging." It is also known that the process of continuous reaction may be used as a research tool to produce large numbers of different materials by varying the feeds (see e.g., Nelson, J. M.; Davidson, R. S.; Cernohous, J. J.; Annen, M. J.; McNerney, R.; Ferguson, R. W.; Maistrovich, A. R.; Higgins, J. A. US 2003/0035756A1, Feb. 20, 2003. "Continuous Process for the Production of Combinatorial Libraries of Materials"). It is also known that there are some favorable conditions under which hydrothermal synthesis may be carried out in a low solids (high dilution) environment (see e.g., Rollmann, L. D.; Valyocsik, E. W. U.S. Pat. No. 4,374,093, Feb. 15, 1983. "Continuous-Stream Upflow Zeolite Crystallization Apparatus"). It is also known that under some circumstances it may be possible to carry out hydrothermal synthesis under high solids conditions (see e.g., Miller, S. J. U.S. Pat. No. 5,558,851, Sep. 24, 1996. "Preparation of Aluminosilicate Zeolites").

The present invention discloses high solids, continuous or semi-continuous hydrothermal synthesis of microporous or mesoporous materials. This invention will accelerate the discovery of new materials in the high solids crystallization regime. The process allows for faster throughput and in-situ modification of the synthesis by varying what reagents are introduced when in the crystallization process. In addition, elimination of extraneous liquor allows for decreased inventory of hazardous materials as well as a decrease in subsequent mother liquor obtained after crystallization or processing.

SUMMARY OF THE INVENTION

The present invention is a microporous or mesoporous composition of matter wherein the composition is formed continuously or semi-continuously in a heated reactor zone where the crystallization zone is at a temperature between about 200° C. and about 500° C. with a residence time less than 24 hours by solid and liquid reagents. The solid reagents have a weight percent between about 45% and about 98% of the total reagents.

In a preferred embodiment, the composition is formed continuously from reagents that include powder, gel or pellets, or combinations thereof.

In other preferred embodiments, the composition includes zeolites, mesoporous, SAPO and AlPO$_4$ materials.

The invention also includes a continuous or semi-continuous process for the hydrothermal manufacture of microporous or mesoporous compositions. The process includes the step of feeding solid and liquid reagents into a heated reactor zone at a temperature between 200° and 500° C. with a residence time less than 24 hours. The solid reagents have a weight percent between 45% and 98% of the reagents.

DETAILED DESCRIPTION OF THE PREFERRED EMBODIMENTS

The present invention includes a process and the composition of matter formed by a given process. The process includes the continuous or semi-continuous hydrothermal synthesis of microporous or mesoporous materials with high solids content ranging from about 45% to about 98%, preferably about 50% to about 95% and most preferably about 55% to about 90%. Solids are defined as the material left in the synthesis mixture after subtracting water added as solvent, water formed by initial reactions such as acid and base neutralization, and water carried into the mixture as "water of hydration."

Figure 1:
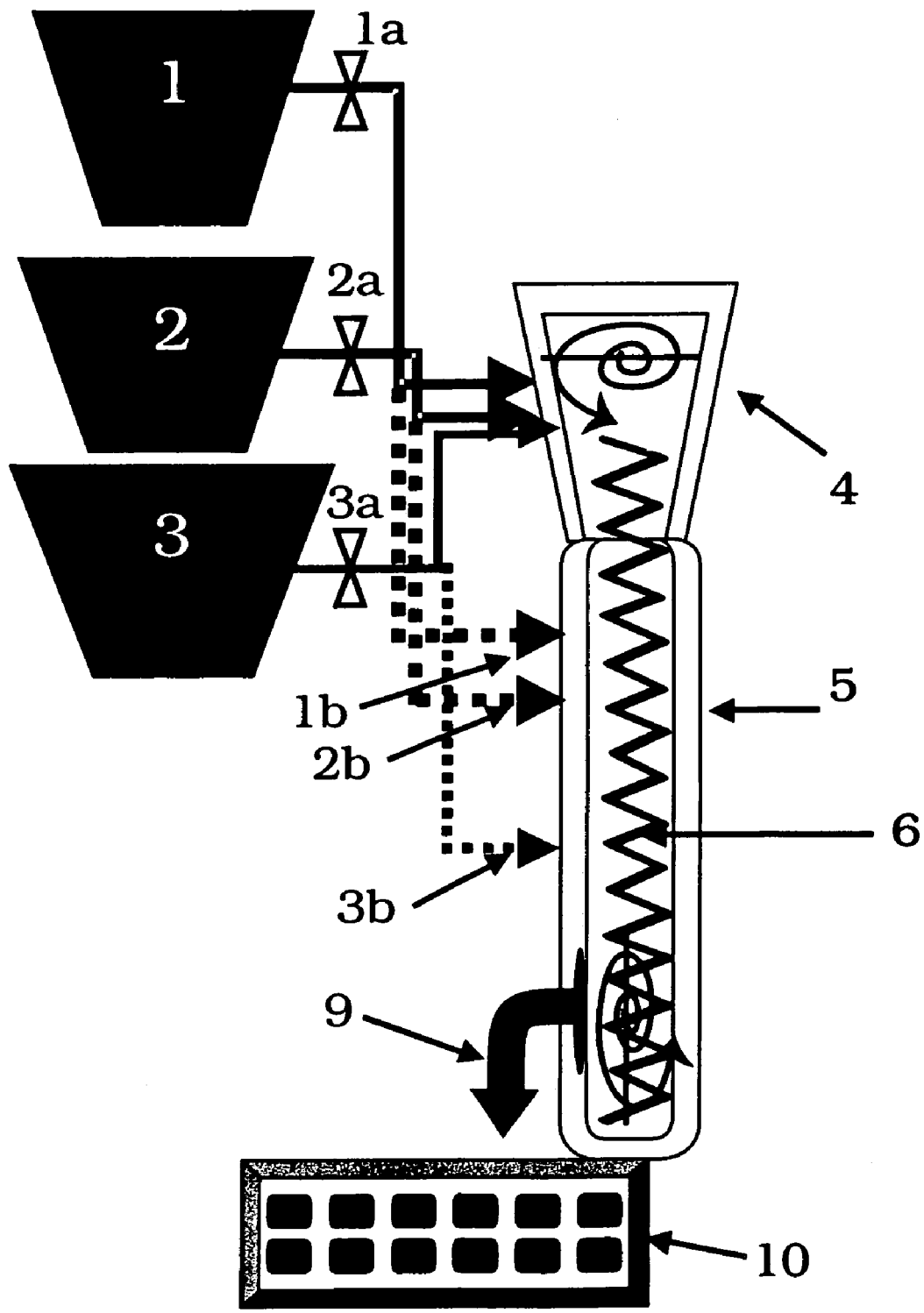
FIG. 1 shows a schematic of a device for the manufacture of the compositions of the present invention.

The process of the present invention may be better understood by reference to the figures, where FIG. 1 illustrates, schematically, one embodiment of the high solids synthesis process taught herein.

In FIG. 1, a plurality of containment vessels, illustrated as containers 1, 2 and 3, contain synthesis feed and/or reagents, such as $SiO_2$, $Al_2O_3$, NaOH, and polymers, for example. Conventional conduct means and flow feed controllers 1a, 2a, 3a are used to selectively control the synthesis feed and/or reagent from the container(s) to a feed hopper 4. In a preferred embodiment, a synthesis vessel atmosphere control means (not illustrated) may be used to selectively control the atmosphere content of any or all of the vessels comprising the apparatus of FIG. 1. An inert atmosphere such as nitrogen, may be utilized to advantage in one or more of the FIG. 1 vessels.

The synthesis feed and/or reagents from the feed hopper 4, which comprise the synthesis mixture, are conveyed to a reactor vessel 5. In a preferred embodiment, feed hopper 4 is operably coupled to reactor vessel 5. Reactor vessel 5 is operably divided into multiple zones, here illustrated by dashed lines within reactor vessel 5. Means for conveying the synthesis mixture 6 may include a rotary calciner or a rotary screw (auger), such as an extruder.

The multiple zones of the reactor vessel are selectively heated to control the temperature of the synthesis mixture during residence in that zone and the pressure in that zone. Control of these synthesis conditions provide the user of this process the ability to control and modify the nucleation and crystallization parameters of the synthesis mixture. These zones are generally characterized as crystallization zones, where the synthesis mixture is maintained at temperatures ranging from about 200° C. to about 500° C., and conveyance zones where the synthesis mixture is relatively cooler, ranging from about 50° C. to about 200° C.

In an alternate embodiment, multiple injection ports (here illustrated by dashed liens 1b, 2b, and 3b) along the reaction vessel 5, may be used to selectively add reagents to one or more of the crystallization or conveyance zones of reactor vessel 5.

In yet a further alternate embodiment, the feed can be pellets consisting of pressed reagents or pressed dry reagents into which are sprayed one or more liquid. The pellets may then pass on a heated belt or other conveyance means (not illustrated) to effect reaction. The temperature, pressure, and residence time conditions are selectively modified to control nucleation and crystallization of the product within the high solid synthesis mixture or pellet. Continuous modifications to the feed composition and crystallization conditions time and temperature can be conventionally effected. This allows for the systematic exploration of a continuum of synthesis parameters (e.g., composition and/or conditions) with the end objective being the discovery of new materials. This technique can be used to readily investigate a composition phase diagram in a continuous method in search of narrow composition range and/or conditions used for a specific crystalline product. Included in the synthesis mixture may be an inert or substantially inert polymer such as polyethylene, which may be used to facilitate conveyance through the heated reactor. The specific polymer employed is a function of the targeted reaction temperature. Other additives are available and known to those skilled in the art that facilitate the conveyance of material through the conveyance zones and crystallization zones of reaction vessel 5 by modifying the viscosity, drag, or lubricity of the synthesis mixture. The product is delivered at 9 in a continuous fashion for further processing (e.g., a belt filter for washing/exchanging, or a calciner) or for analysis, e.g., by x-ray diffraction (XRD), here illustrated as further processing means 10.

One embodiment is a process for continuous crystallization of microporous and mesoporous materials from high solids reaction mixtures. The advantage of this invention is that it allows for the use of a synthesis mixture not suitable for standard batch crystallization. It allows for a minimization of reagents, thereby minimizing inventory. The procedure using high solids preparations also minimizes the volume of subsequent mother liquor, which needs to be separated and disposed of after crystallization. These advantages in reduced inventory and reduced liquor are particularly germane with those reaction mixtures that utilize HF as a component.

In a preferred embodiment, the feed and/or reagents that will comprise the synthesis mixture would be metered into the feed hopper 4 from the reactant containers 1, 2, 3, etc. The feed could be in the form of a powder or a pellet (e.g., extrudate). A $N_2$ purge may be advantageously used in the cases where an air sensitive structure directing agent was employed. The temperature of the crystallization zones of the reaction vessel 5 would be adjusted prior to the reactant introduction, to between about 200° C. and about 500° C., preferably between about 250° C. and about 350° C. Temperatures outside the crystallization zones, i.e., the conveyance zones, would be maintained relatively cooler, ranging from abut 50° C. to about 200° C. The feed rate speed of barrel rotation, or auger of the unit could be altered to affect residence time.

Several examples of high solids crystallizations that may be fabricated by the present invention follow below. Although these examples are zeolites, it is not the intent to limit this technique to zeolite species. The process can be used for processing high solid formulations for a multitude of materials including, but not limited to, zeolites, mesoporous materials, $AlPO_4$ materials, SAPO materials, mixed metal oxides, and amorphous phases. As shown in these examples, fluorided structure directing agents (e.g., tetrabutylammonium fluoride) facilitates the crystallization at high temperature and shorter reactant residence times. This may be advantageous when determining residence time during operation.

The following examples illustrate conditions suitable for manufacturing materials under the process of the present invention:

EXAMPLE 1

Synthesis of Zeolite ITQ-13 as Pellets or Powder

Figure 2:
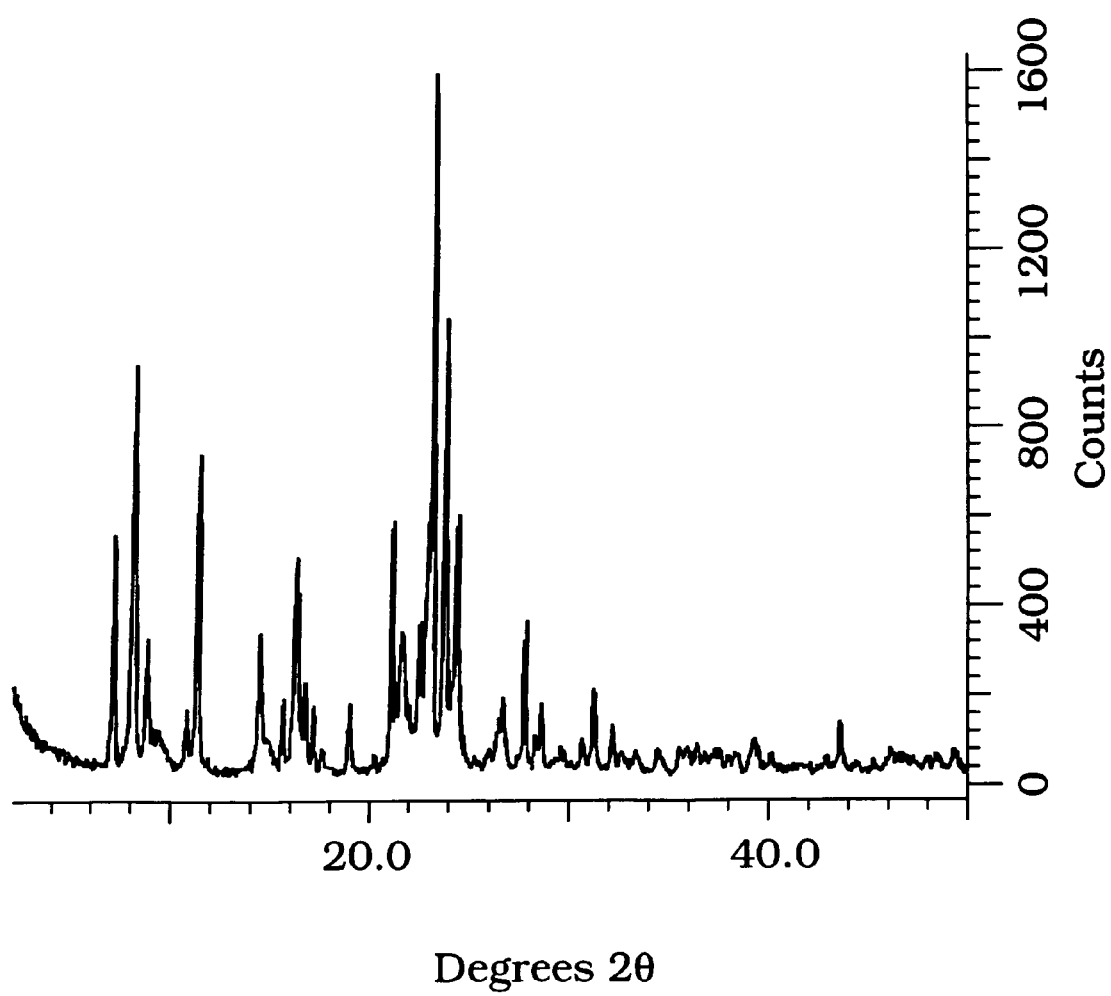
FIG. 2 shows the x-ray diffraction pattern of the zeolite formed in Example 1.

This example is 56% solids. UltraSil VN 3SP-PM (solid silica source, 90.13 g) was placed in the bowl of a KitchenAid mixer and a solution of 1.39 g $H_3BO_3$ and 97.85 g 54.9% hexamethonium hydroxide in 52.22 g $H_2O$ added followed by 23.69 g 48% HF while mixing with the standard batter paddle at slow speed. After the wet ingredients had been mixed in, 2.73 g ITQ-13 seeds were mixed in. The ratio of $H_2O/SiO_2$ in the mixture was 4.02:1. A small sample of this mixture was spread on a porcelain dish and allowed to dry at room temperature overnight. The weight loss indicated that the $H_2O/SiO_2$ in this sample was 2.7:1. A 3 g sample of the undried mixture was compressed to an ~⅛" by 1" pellet in a pellet press using a pressure of about 500 psi. The dry powders and the pellet were heated separately in plastic bottles at 200° C., 24 hour X-ray diffraction showed the products to be ITQ-13 as exemplified by FIG. 1 for the bulk powder. FIG. 2 is a photograph of the pellet after reaction, which shows that the physical structure was maintained more-or-less intact despite the lack of binding agents.

EXAMPLE 2

Synthesis of Zeolite Beta

Figure 3:
FIG. 3 shows a photograph of the pellet after processing as described in Example 1.

This example is 63% solids. A mixture of 60.08 g UltraSil VN 3SP-PM and 2.76 g zeolite beta seeds was stirred in the stainless steel bowl of a KitchenAid mixer and a solution of 8.97 g 46% sodium aluminate ($Na_{1.26}AlO_2(OH)_{0.26}$) and 8.13 g 48% HF in 1.33 g $H_2O$ added followed by 60.54 g of 35% tetraethyl-ammonium hydroxide. The pourable solid was heated in a plastic bottle at 240° C. for 4 hours and the product was found to be zeolite beta by X-ray powder diffraction, FIG. 3. The $H_2O/SiO_2$ ratio was 4.04.

EXAMPLE 3

Synthesis of Zeolite Ge-Beta

This example is 60% solids. The structure of the organic directing agent, described as $Et_6$-Diquat-5 fluoride, is:

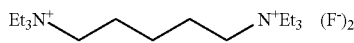

Figure 4:
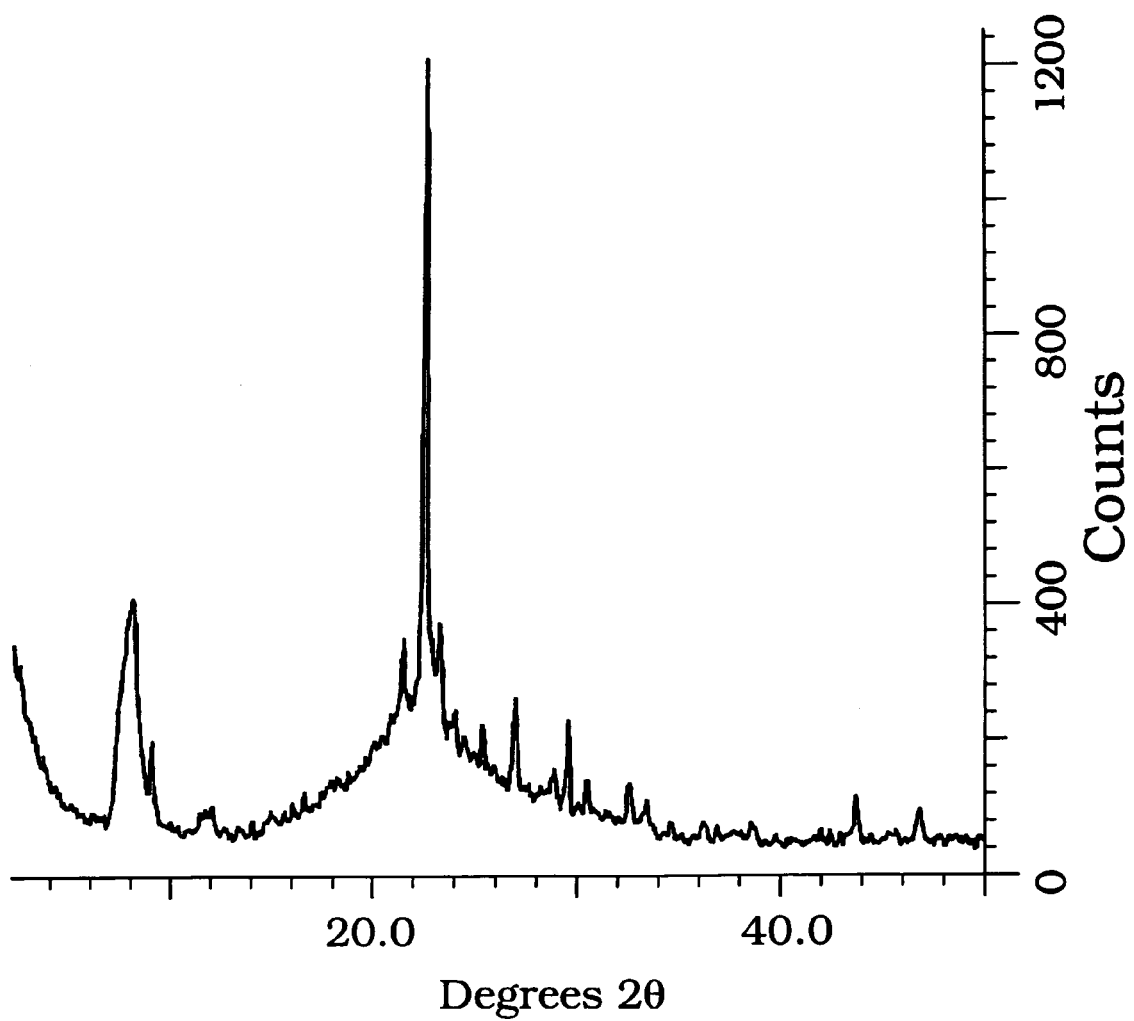
FIG. 4 shows the x-ray diffraction pattern of the zeolite formed in Example 2.
Figure 5:
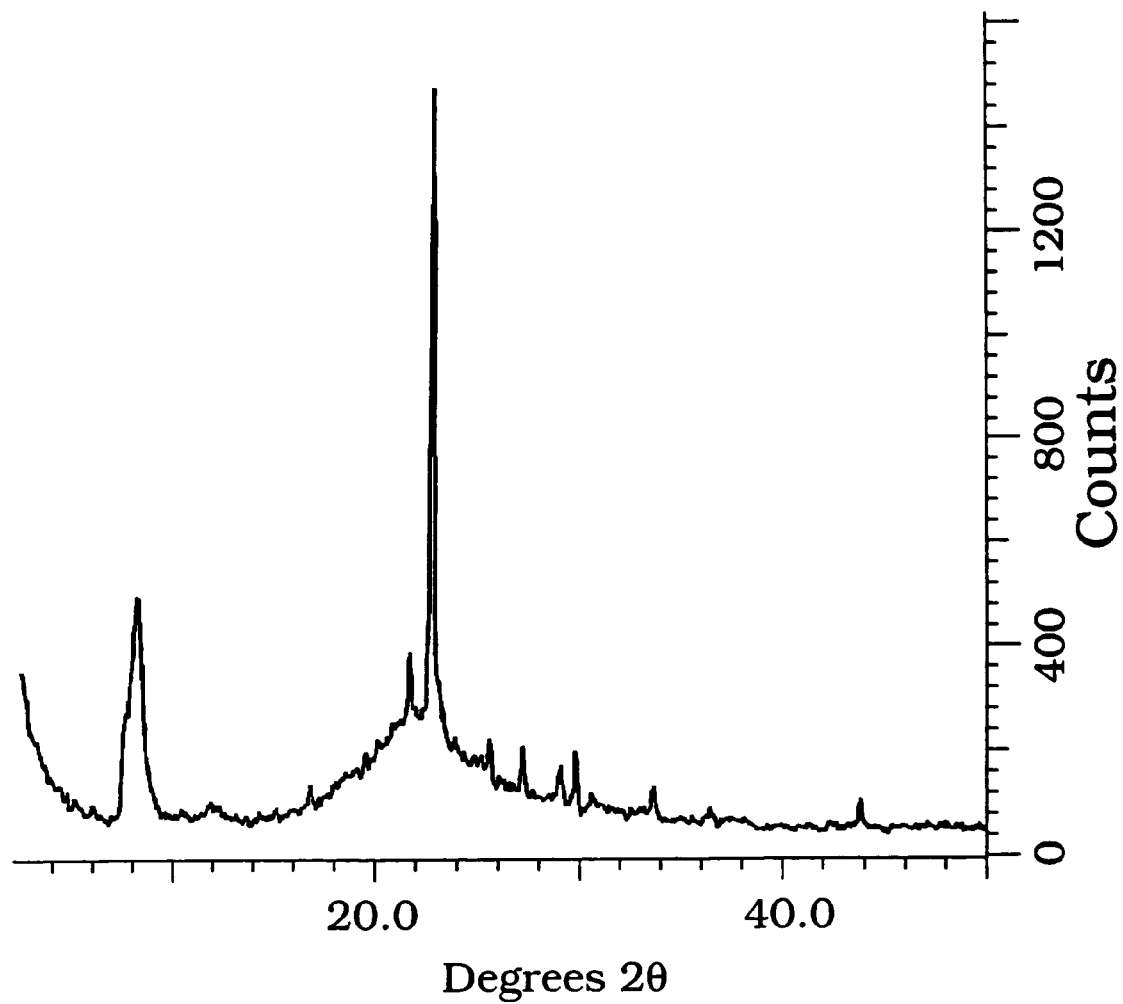
FIG. 5 shows the x-ray diffraction pattern of the zeolite formed in Example 3.

To 42.06 g UltraSil VN 3SP-PM in a KitchenAid mixer were added a solution of 76.99 g 42.7% $Et_6$-Diquat-5 fluoride and 2.22 g 48% HF in 5.80 g $H_2O$. After the solid was thoroughly mixed, a 20 g portion was placed in a plastic bottle and 0.22 g $GeO_2$ mixed in by hand. The bottle was heated at 200° C. for 24 hours and the product shown to be zeolite beta by powder X-ray diffraction, FIG. 4. Another 20 g sample that did not have the $GeO_2$ added produced zeolite ZSM-51 in the same period at the same temperature, FIG. 5.

EXAMPLE 4

Synthesis of Zeolite ZSM-5

Figure 6:
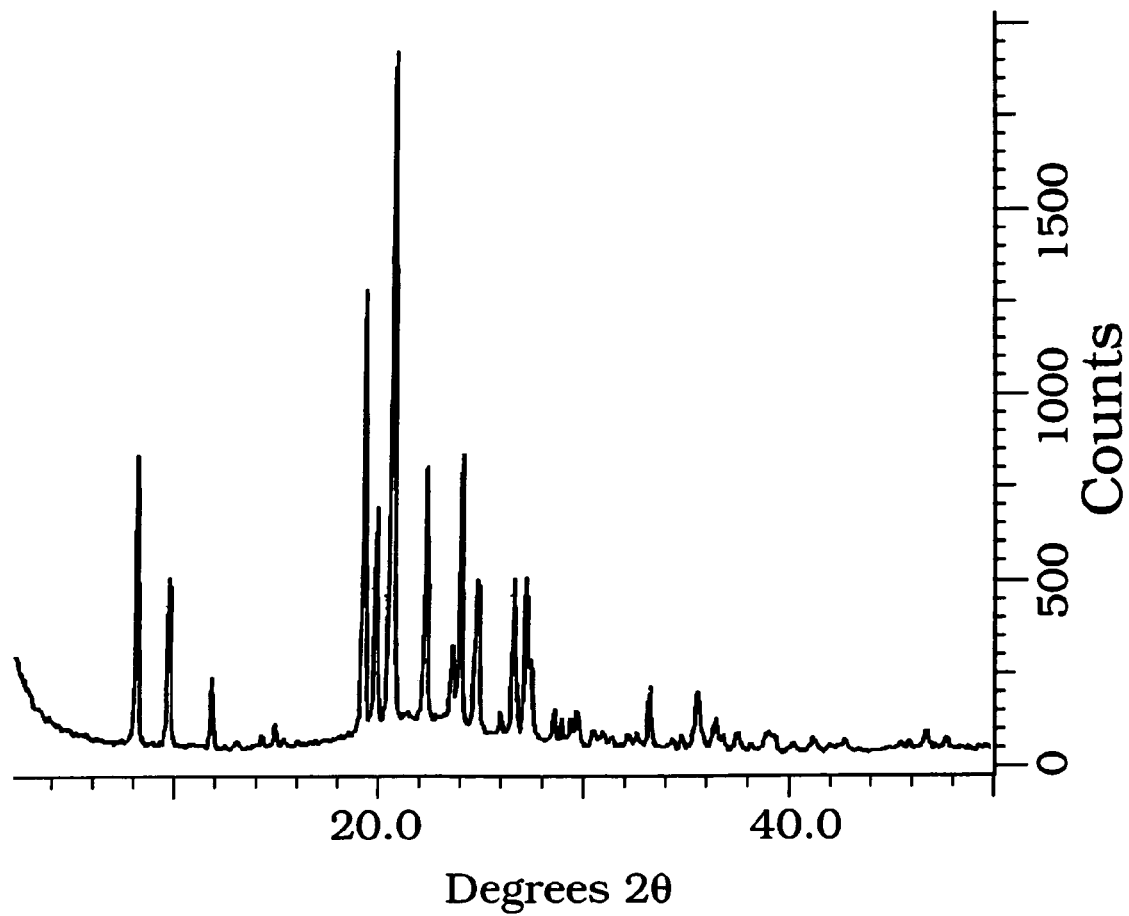
FIG. 6 shows the x-ray diffraction pattern of another zeolite formed in Example 3.

This example is 58% solids. To a slowly stirred mixture of 60.08 g UltraSil VN 3SP-PM and 0.60 g ZSM-5 seeds in a KitchenAid mixing bowl were added a solution containing 7.50 g $Al(NO_3)3.9H_2O$, 3.60 g $H_2O$, 10.42 g 48% HF, and 101.68 g 40% tetraproplylammonium hydroxide. Twenty-five grams of the mixture were placed in a plastic bottle and heated 1 hour at 240° C. to give a product identified as ZSM-5 by powder X-ray diffraction FIG. 6. Similar results were obtained on 25 g samples treated at 200 and 220° C. for 4 hours. The 240° C. product was calcined by increasing the temperature at 2° C./min to 540° C. under a $N_2$ atmosphere, holding 1 hour at 540° C., switching the atmosphere to air, holding a further 4 hours at 540° C., then cooling to room temperature. The material so obtained was found to have an alpha value of 195.

EXAMPLE 5

Synthesis of Zeolite Chabazite

This example is 56% solids. The structure of the organic directing agent, described as adamantammonium fluoride, is:

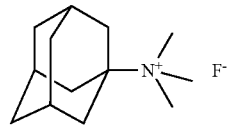

Figure 7:
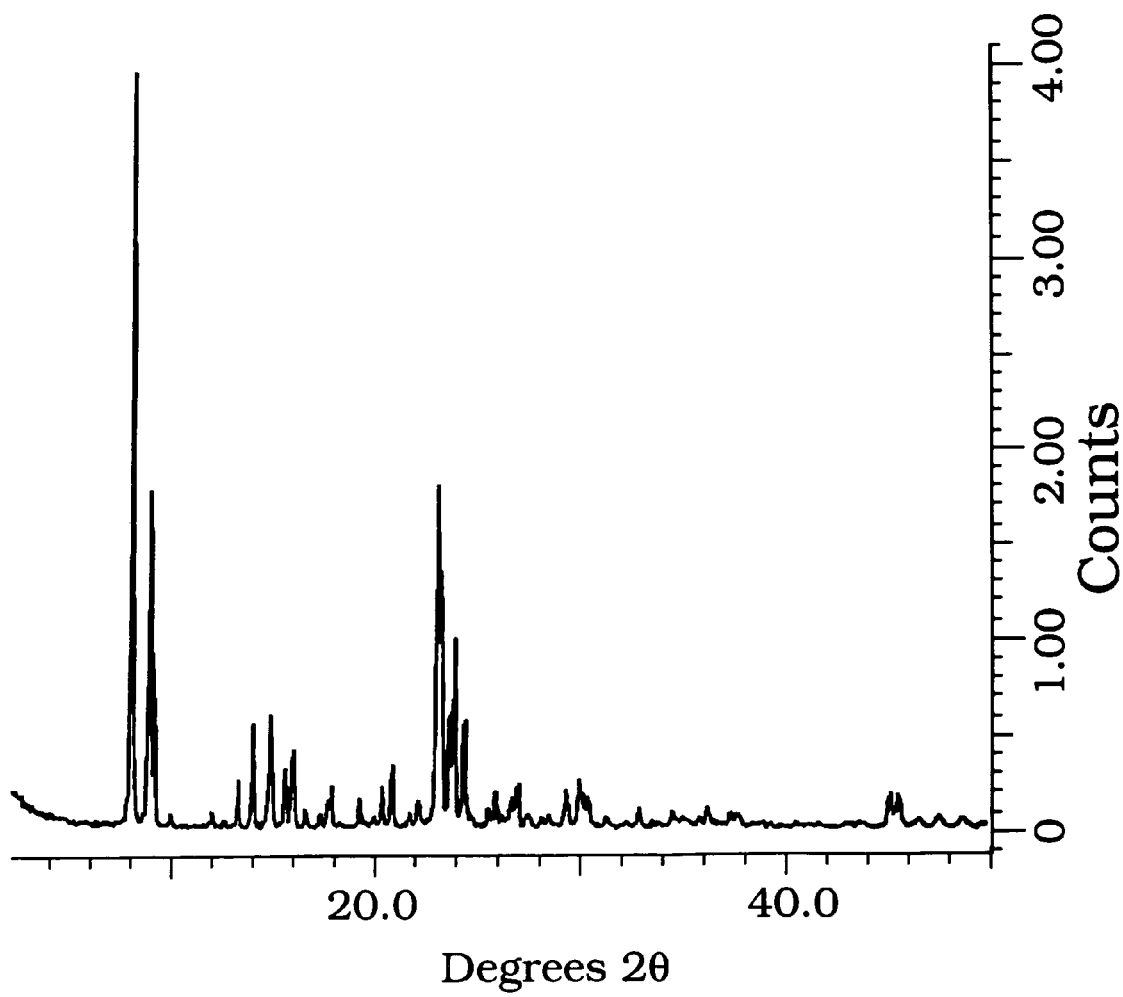
FIG. 7 shows the x-ray diffraction pattern of the zeolite formed in Example 4.
Figure 8:
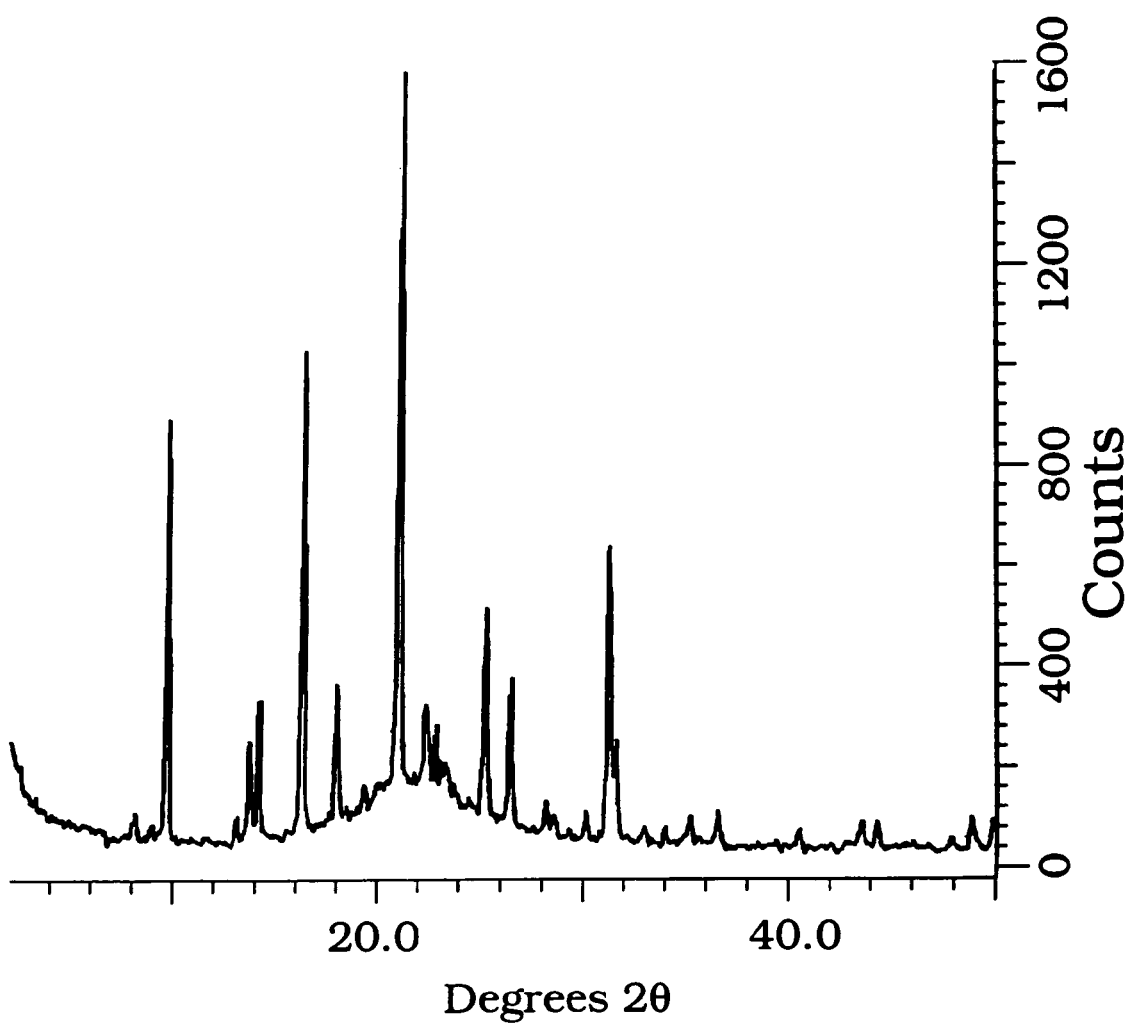
FIG. 8 shows the x-ray diffraction pattern of the zeolite formed in Example 5.

Chabazite seeds (0.22 g) and UltraSil VN 3SP-PM (7.21 g) were mixed in a plastic beaker then a solution of 0.17 g $Al(NO_3)_3.9H_2O$, 10.94 g 67.4% adamantammonium fluoride directing agent, and 2.85 g $H_2O$ added with hand mixing. The mixture was placed in a plastic bottle and heated 24 hours at 200° C. Powder X-ray diffraction showed the product to be chabazite with some amorphous material, FIG. 7.

EXAMPLES 6 THROUGH 8

Synthesis of Zeolite ZSM-5

These examples use the following gel. A mixture was prepared consisting of 37.62 g 50% aqueous NaOH, 52.18 g 47% aqueous $Al_2(SO_4)_3$, and 90.2 g UltraSil VN 3SP-PM. This reactant mixture was well mixed using a KitchenAid. The finished reactant gel had a solids level of 69%.

EXAMPLE 6

A 60 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 160° C. for 16 hours and the product was amorphous.

EXAMPLE 7

A 30 g aliquot of the mixture was added to a Teflon lined 30-cc autoclave. The gel was heated to 160° C. and after 60 hours under static conditions, mordenite and kenyaite were the products. Further crystallization to 245 hours produced only mordenite with quartz.

EXAMPLE 8

A 60 g aliquot of the mixture were added to a Parr autoclave with a modified stir blade. Several impellers were placed upon the stir blade shaft to form a cork-screw alignment of blades. This was designed to mimic an extruder screw in a batch operation. The gel was heated to 250° C. for 4 hours and the product was ZSM-5.

EXAMPLES 9 THROUGH 11

Attempted ZSM-5 Crystallization

These examples use the following gel. A mixture was prepared consisting of 2.51 g deionized water, 15.3 g 50% aqueous NaOH, 14.6 g 47% aqueous $Al_2(SO_4)_3$, 56 g UltraSil VN 3SP-PM, and 106.64 g 80% aqueous Tetrabutylammonium bromide (TBABr) commercial grade supplied by SACHEM. This reactant mixture was well mixed using a KitchenAid. The finished reactant gel had a solids level of 77%.

EXAMPLE 9

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 160° C. for 16 hours and the product was amorphous.

EXAMPLE 10

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 200° C. for 8 hours and the product was amorphous.

EXAMPLE 11

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 250° C. for 4 hours and the product was amorphous.

EXAMPLES 12 THROUGH 14

Attempted ZSM-5 Crystallization

These examples use the following gel. A mixture was prepared consisting of 15.3 g 50% aqueous NaOH, 14.6 g 47% aqueous $Al_2(SO_4)_3$, 56 g UltraSil VN 3SP-PM, and 99 g 75% aqueous Tetrabutylammonium fluoride (TBAF) technical grade supplied by Adrich chemical. This reactant mixture was well mixed using a KitchenAid. The finished reactant gel had a solids level of 75%.

EXAMPLE 12

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 160° C. for 24 hours and the product was ZSM-5.

EXAMPLE 13

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 200° C. for 16 hours and the product was ZSM-5.

EXAMPLE 14

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated to 250° C. for 8 hours and the product was ZSM-5.

EXAMPLES 15 THROUGH 16

ZSM-5 Crystallization

These examples use the following gel. A mixture was prepared consisting of 8.5 g 50% aqueous NaOH, 8.1 g 47% aqueous $Al_2(SO_4)_3$, 31 g UltraSil VN 3SP-PM, and 52 g 75% aqueous tetrabutylammonium fluoride (TBAF) technical grade supplied by Adrich chemical. This reactant mixture was well mixed using a KitchenAid. The finished reactant gel had a solids level of 75%.

EXAMPLE 15

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated rapidly at 4° C. per minute to reaction temperature of 250° C. and crystallized for 2 hours. The product was ZSM-5.

EXAMPLE 16

A 50 g aliquot of the mixture was added to a Parr autoclave with a modified stir blade. Several impellers were placed upon the stir blade shaft to form a cork-screw alignment of blades. This was designed to mimic an extruder screw in a batch operation. The gel was heated at 0.5° C. per minute to reaction temperature of 250° C. and crystallized for 2 hours. The product was ZSM-5.

EXAMPLE 17

ZSM-5 Crystallization

A mixture was prepared consisting of 4.5 g 50% aqueous NaOH, 404 g 47% aqueous $Al_2(SO_4)_3$, 15.2 g Promeks silica, and 28 g 75% aqueous tetrabutylammonium fluoride (TBAF) technical grade supplied by Adrich chemical. This reactant mixture was well mixed. The finished reactant gel had a solids level of 76%. The mixture was added to a Parr autoclave with a modified stir blade. Several impellers were placed upon the stir blade shaft to form a cork-screw alignment of blades. This was designed to mimic an extruder screw in a batch operation. The gel was heated rapidly at 4° C. per minute to reaction temperature of 250° C. and crystallized for 2 hours. The product was ZSM-5.

EXAMPLE 18

Synthesis of High Silica ZSM-5

A mixture was prepared consisting of 1.5 g 50% aqueous NaOH, 0.39 g 47% aqueous $Al_2(SO_4)_3$, 5.5 g UltraSil VN 3SP-PM silica, and 9.2 g 75% aqueous tetrabutylammonium fluoride (TBAF) technical grade supplied by Adrich chemical. This reactant mixture was well mixed. The finished reactant gel had a solids level of 77%. The mixture was added to a Teflon lined 30-cc autoclave with no stirring mechanism. The gel was heated to 240° C. and after 2 hours, ZSM-5 was the product.

EXAMPLE 19

Attempted Synthesis of High Silica ZSM-5, Low Sodium

A mixture was prepared consisting of 0.55 g 50% aqueous NaOH, 0.39 g 47% aqueous $Al_2(SO_4)_3$, 5.5 g UltraSil VN 3SP-PM silica, and 9.2 g 75% aqueous tetrabutylammonium fluoride (TBAF) technical grade supplied by Adrich chemical. This reactant mixture was well mixed. The finished reactant gel had a solids level of 79%. The mixture was added to a Teflon lined 30-cc autoclave with no stirring mechanism. The gel was heated to 240° C. and after 2 hours, the product was amorphous.

EXAMPLE 20

Attempted Synthesis of High Silica ZSM-5, no Additional Sodium

A mixture was prepared consisting of 0.0 g 50% aqueous NaOH, 0.39 g 47% aqueous $Al_2(SO_4)_3$, 5.5 g UltraSil VN 3SP-PM silica, and 9.2 g 88% aqueous tetrabutylammonium fluoride (TBAF) technical grade supplied by Adrich chemical. This reactant mixture was well mixed. The finished reactant gel had a solids level of 80%. The mixture was added to a Teflon lined 30-cc autoclave. The gel was heated to 240° C. and after 2 hours under static conditions, the product was amorphous.

EXAMPLE 21

A synthesis mixture is prepared consisting of 455 g 50% aqueous NaOH, 637 g 47% aqueous $Al_2(SO_4)_3$, and 1158 g $SiO_2$, UltraSil VN 3SP-PM. This reactant mixture is well mixed using a KitchenAid mixer.

This mixture is fed through the feed hopper at less than 250 g per hour into the heated conveyance reactor. The first heated zone (1) and the last heated zone (zone 15) are at between 50-80° C. and the screw design in these regions is such that they optimize compaction. The temperature zones 2-14 are heated to approximately 300° C. The screw design in these regions is such to maximize void space, maximize residence time, and allow conveyance. The total residence time in the reactor is 2 to 8 hours. The product is ZSM-5 with the x-ray pattern shown in FIG. 2.

EXAMPLE 22

The synthesis mixture prepared in Example 1 is fed through the reactor hopper at a rate less than 250 g per hour. Downstream from this feed hopper is a second hopper containing granulated polyethylene with a melt index (MI, ASTM D 1238) of 2250 g/10 min. The polymer is fed at a rate of between 12-25 g per hour concurrent with the SiO2-reaction mixture. The first heated zone (1) and the last heated zone (zone 15) are at between 50-80° C. and the screw design in these regions are such that they optimize compaction. The temperature zones 2-14 are heated to approximately 300° C. The screw design in these regions is such to maximize void space, allow conveyance at maximum residence time. The total residence time in the reactor is 2 to 8 hours. The product is ZSM-5 with the x-ray pattern shown in FIG. 3.

EXAMPLE 23

A mixture of 600 g UltraSil VN 3SP-PM and 27.6 g zeolite beta seeds is stirred in the stainless steel bowl of a KitchenAid mixer (Reactant 1). This dry mixture is charged to Feed Hopper #1. Separately, a solution of 90 g 46% sodium aluminate ($Na_{1.26}AlO_2(OH)_{0.26}$) and 81 g 48% HF in 13.3 g $H_2O$ is prepared (Reactant II) and charged to a peristaltic pump. A third solution of 605 g of 35% tetraethylammonium hydroxide, (Reactant III) is charged to a second peristaltic pump.

The silica-seed reaction mixture, Reactant I, is fed through the reactor hopper at a rate less than 250 g per hour. Downstream from this feed hopper is Hopper #2 containing granulated polyethylene with a melt index (MI) of 2250. The polymer is fed at a rate of between 12-25 g per hour concurrent with Reactant I. Downstream of the polymer hopper are two injection ports through which the liquid reagents (Reactants II and III) are injected at rates of less than 75 g per hour and less than 250 g per hour, respectively. The rates of addition of all the reactants are adjusted to obtain targeted elemental ratios.

The first heated zone (1) and the last heated zone (zone 15) are at between 50-80° C. and the screw design in these regions are such that they optimize compaction. The temperature zones 2-14 are heated to approximately 300° C. The screw design in these regions is such to maximize void space, allow conveyance at maximum residence time. The total residence time in the reactor is 10-60 minutes. The product is zeolite beta with the x-ray pattern shown in FIG. 4.

EXAMPLE 24

Synthesis of Beta with a Composition Continuum 600 g UltraSil VN 3SP-PM is charged to feed Hopper #1. A solution of 1.0 g 46% sodium aluminate ($Na_{1.26}AiO_2(OH)_{0.26}$) and 1.0 g 48% HF in 0.15 g $H_2O$ is prepared (Reactant II) and charged to Feed Hopper 3. A third solution of 605 g of 35% tetraethylammonium hydroxide is charged to a peristaltic pump.

The silica is fed through the Hopper #1 at a rate less than 250 g per hour. Downstream, Hopper 2 contains granulated polyethylene with a melt index (MI) of 2250. The polymer is fed at a rate of between 12-25 g per hour concurrent with the silica. Downstream of the polymer hopper is Hopper #3 containing the alumina solution, Reactant II. Hopper #3 doses the entire charge at once. Downstream of Hopper #3 is an injection ports through which the tetraethylammonium hydroxide is fed at a rate less than 250 g per hour.

The first heated zone (1) and the last heated zone (zone 15) are at between 50-80° C. and the screw design in these regions are such that they optimize compaction. The temperature zones 2-14 are heated to approximately 300° C. The screw design in these regions is such to maximize void space, allow conveyance at maximum residence time. The total residence time in the reactor is 10-60 minutes.

As the finished product exits the reactor zone, a continuum of $SiO_2/Al_2O_3$ ratios is observed where the initial product has a relatively low $SiO_2/Al_2O_3$ and the ratio increases as a function of product exiting. The product ribbon is sliced and analyzed by x-ray diffraction. The product is zeolite beta with the x-ray pattern shown in FIG. 4 and a range of $SiO_2/Al_2O_3$ ratios from 25 to 500.

What is claimed is:

1. A continuous or semi-continuous process for the hydrothermal manufacture of a microporous or mesoporous composition comprising feeding solid and liquid reagents into a heated reactor vessel that include an inert or substantially inert polymer to facilitate conveyance at a temperature between 200° C. and 500° C. with a residence time less than 24 hours wherein said solid and liquid reagents form a synthesis mixture having a solids content ranging from 45% to 98% and said heated reactor vessel includes a rotary calciner or a rotary screw as means for conveying the synthesis mixture through the heated reactor vessel said composition is formed continuously and collected.

2. The process of claim 1 wherein said reagents include aluminum, silicon and water.

3. The process of claim 2 wherein said composition is a zeolite.

4. The process of claim 3 wherein said zeolite is ITQ-13.

5. The process of claim 3 wherein said zeolite is zeolite beta.

6. The process of claim 3 wherein said zeolite is chabazite.

7. The process of claim 2 wherein said zeolite is ZSM-5.

8. The process of claim 1 wherein the synthesis mixture has a solids content ranging from 50% to 95%.

9. The process of claim 1 wherein the synthesis mixture has a solids content ranging from 55% to 90%.

10. The process of claim 1 wherein said solid and liquid reagents are injected into the heated reactor vessel.

11. The process of claim 1 wherein the composition of the synthesis mixture is continuously changed.

12. The process of claim 1 wherein the heated reactor vessel is an extruder.

* * * * *